Figure 3:
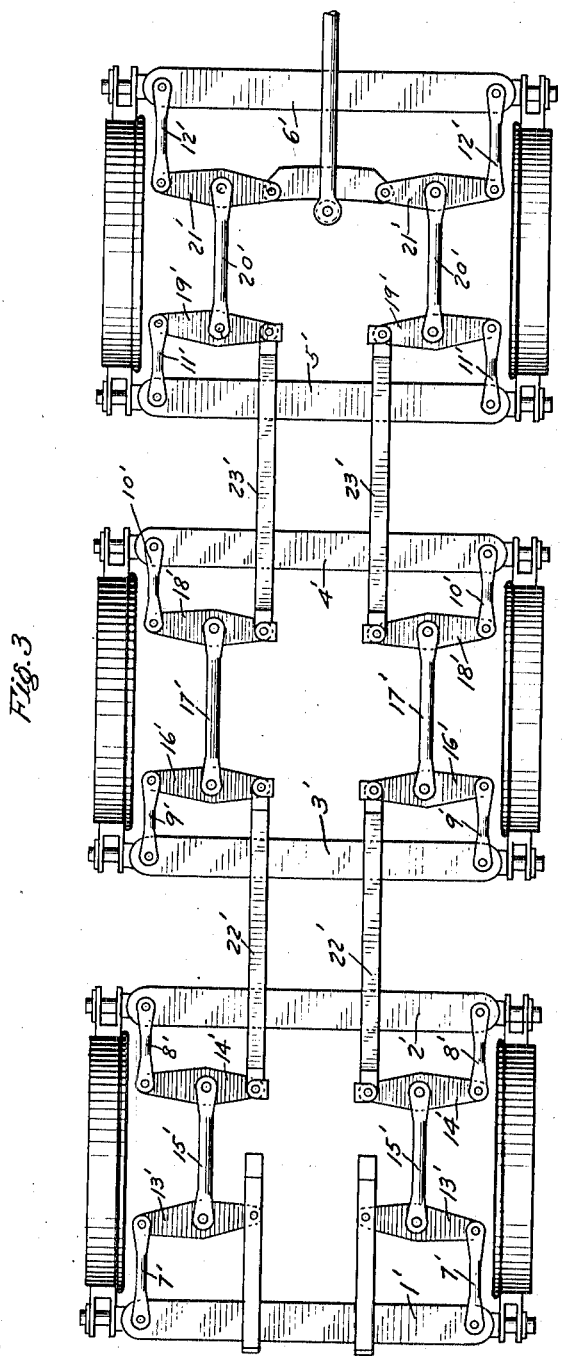

T. L. BURTON.
CLASP BRAKE.
APPLICATION FILED JUNE 4, 1912.
1,099,234.
Patented June 9, 1914.
2 SHEETS—SHEET 1.
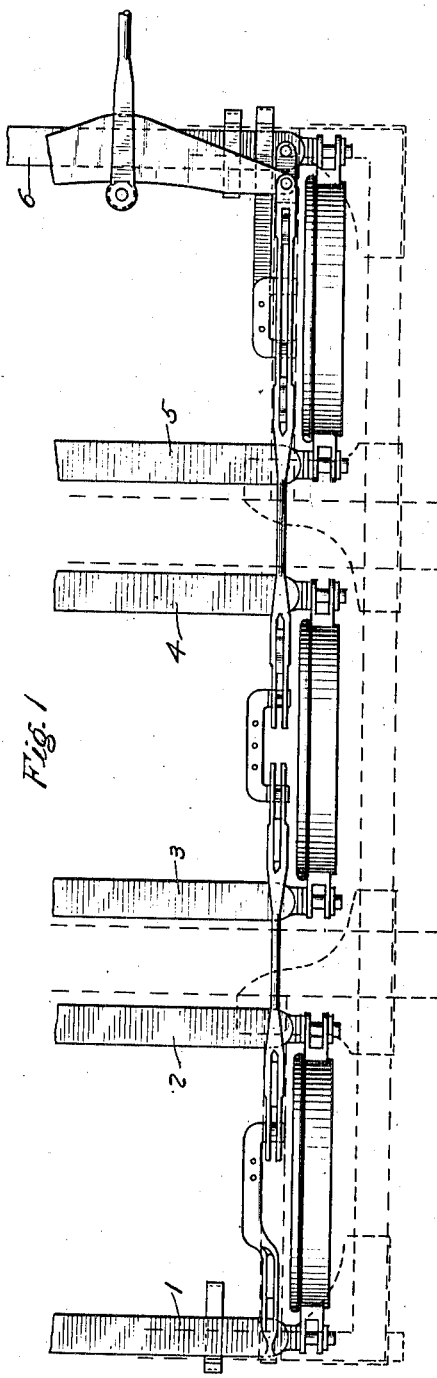
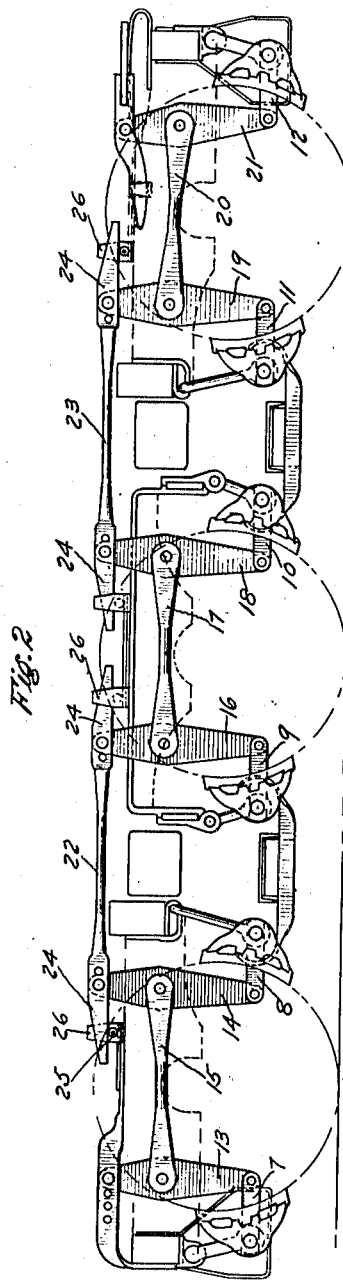
WITNESSES
INVENTOR
Thomas L. Burton
by Wm. M. Cady
Att'y.

T. L. BURTON.
CLASP BRAKE.
APPLICATION FILED JUNE 4, 1912.

1,099,234.

Patented June 9, 1914.
2 SHEETS—SHEET 2.

WITNESSES

INVENTOR
Thomas L. Burton
by Wm. M. Cady
Atty.

UNITED STATES PATENT OFFICE.

THOMAS L. BURTON, OF PITTSBURGH, PENNSYLVANIA, ASSIGNOR, BY MESNE ASSIGNMENTS, TO THE AMERICAN BRAKE COMPANY, OF ST. LOUIS, MISSOURI, A CORPORATION OF MISSOURI.

CLASP-BRAKE.

1,099,234. Specification of Letters Patent. Patented June 9, 1914.

Application filed June 4, 1912. Serial No. 701,555.

*To all whom it may concern:*

Be it known that I, THOMAS L. BURTON, a citizen of the United States, residing at Pittsburgh, in the county of Allegheny and State of Pennsylvania, have invented new and useful Improvements in Clasp-Brakes, of which the following is a specification.

This invention relates to brake rigging for railway cars, and more particularly to a brake rigging adapted for what are known as clasp brakes.

In brake rigging constructions, it is highly desirable to avoid the use of compression members for the reason that compression members must be made heavy and stiff in order to prevent buckling and excessive movement of the parts in the act of forcing the brake shoes against the car wheels, and one object of my invention is to provide a brake rigging construction in which all of the connecting rods are tension members, so that compression members are dispensed with.

Another object of my invention is to provide improved means for supporting the brake rigging members in position.

In the accompanying drawings, Figure 1 is a half plan view of a six wheel truck brake rigging showing my improvements applied thereto; Fig. 2 a side elevation thereof; and Fig. 3 a plan view of a brake rigging construction for a six wheel truck embodying a modified form of my invention.

According to the construction shown in Figs. 1 and 2, brake beams 1, 2, 3, 4, 5, and 6, provided with the usual hangers, are pivotally connected to the respective links 7, 8, 9, 10, 11, and 12 located on opposite ends of the beams adjacent to the car wheels. A dead lever 13, having one end fulcrumed, is pivotally connected to link 7 at the opposite end, and link 8 connected to the brake beam on the other side of the car wheel is pivoted to a live lever 14, the levers 13 and 14 being pivotally connected together by a rod 15. Similarly, the intermediate wheels of the truck have a live lever 16 connected to link 9 and a rod 17 connecting the lever 16 with lever 18 which is pivoted to the link 10. The link 11 of the opposite end wheels is connected to live lever 19, and rod 20 connects lever 19 with lever 21 of the link 12. The upper ends of levers 14 and 16 are pivotally connected to rod 22 and the upper ends of levers 18 and 19 are pivotally connected to rod 23, and according to one feature of my improvement the rods 22 and 23 are provided at opposite ends with extensions 24 adapted to rest on rollers 25 suitably mounted within brackets 26 carried by the car truck. The brake rigging is thus supported through the levers 22 and 23 and in action, the parts are free to move longitudinally on the roller bearings provided for the extensions 24.

Another feature of my invention illustrated in Figs. 1 and 2 consists in the arrangement of the truck brake levers so that when the brakes are to be applied the transmission of stress will be in a direction to place each member under tension. This will be clearly seen by tracing the stress from the point of application of power at the upper end of lever 21 through the various brake levers and rods comprising the system to the fulcrum of last lever 13.

In Fig. 3 of the drawings is shown another brake rigging construction for a six wheel truck also embodying the last described feature of my invention. In this case the brake beams, rods and levers 1' to 23' correspond with the brake beams, rods and levers 1 to 23 of the construction shown in Figs. 1 and 2, but the levers and rods are all arranged in substantially a horizontal plane instead of vertically. It will be noted that by locating the connecting rods 15, 17, and 20 above the respective wheel axles, any pair of wheels with the axle may be readily removed without disturbing or disconnecting the brake rigging.

Having now described my invention, what I claim as new and desire to secure by Letters Patent, is:—

1. In a brake rigging, the combination with brake beams, of levers pivoted to said brake beams, a rod connecting said levers, and bearings on the car truck for supporting said rod.

2. In a brake rigging, the combination with two brake beams and levers pivoted to said beams, of a rod connecting said levers, extensions on the opposite ends of said rod, and bearings carried by the car truck for supporting said extensions.

3. In a brake rigging, the combination with two brake beams and levers pivoted to said beams, of a rod connecting said levers, extensions on the opposite ends of said rod, and rollers mounted on the car truck upon which said extensions are adapted to bear.

4. A brake rigging for six-wheeled trucks comprising brake beams applied to both sides of each pair of wheels, levers pivoted to said brake beams, rods connecting the adjacent pairs of brake beam levers between the pairs of wheels, extensions on the opposite ends of said rods, and supports for said extensions carried by the car truck.

5. In a brake rigging, the combination with brake beams applied to both sides of each pair of wheels, of levers pivoted to said beams, a rod connecting adjacent brake beam levers between adjacent pairs of wheels, and bearings on the car truck upon which said rod is mounted.

6. In a brake rigging, the combination with brake shoes, and truck levers for operating the same, of a rod connecting said truck levers, and bearings on the car truck for supporting said rod.

7. In a brake rigging, the combination with brake shoes, and truck levers for operating the same, of a rod connecting two adjacent truck levers and having extensions beyond said levers, and bearings on the car truck for engaging said extensions and supporting the rod.

8. A brake rigging for six-wheeled trucks comprising brake beams applied to both sides of each pair of wheels, levers pivotally connected to said beams, rods connecting the levers of each pair of wheels at points between the beams and the opposite ends of the levers, and rods connecting said opposite ends of the levers of the adjacent brake beams located between adjacent pairs of wheels.

9. A brake rigging for six-wheeled trucks comprising brake beams applied to both sides of each pair of wheels, levers pivotally connected to said beams, rods connecting the levers of each pair of wheels at points between the beams and the opposite ends of the levers, and rods connecting said opposite ends of the levers of the adjacent brake beams located between adjacent pairs of wheels, the last mentioned rods being provided with extensions for supporting the rods and thereby the brake rigging from the car truck.

10. A brake rigging for six-wheeled trucks comprising brake beams applied to both sides of each pair of wheels, levers pivoted to said beams, and rods connecting said levers, all of the rods being tension members.

11. A brake rigging for six wheeled trucks, comprising brake beams applied to both sides of each pair of wheels, levers pivotally connected at their lower ends to said beams, rods connecting the levers of each pair of wheels, and located above the wheel axle, and rods connecting the upper ends of the levers of adjacent brake beams, and located between the adjacent pairs of wheels.

12. A brake rigging for six wheeled trucks, comprising brake beams applied to both sides of each pair of wheels, two sets of truck levers, one for each side of the truck, each lever being pivotally connected at one end to a brake beam, rods connecting the levers of each pair at an intermediate point, and rods connecting the opposite ends of the levers of the adjacent brake beams of the adjacent pairs of wheels.

13. In a brake rigging for six-wheeled trucks, the combination with brake shoes applied to both sides of each pair of wheels, and truck levers for operating the same, of rods connecting together the levers of each pair, and other rods connecting the adjacent levers of adjacent pairs, all of said rods being tension members.

14. In a brake rigging for six-wheeled trucks, the combination with brake shoes applied to both sides of each pair of wheels, and truck levers having connections at their lower ends for actuating said brake shoes, of tension rods connecting the levers of each pair at an intermediate point, and tension rods connecting the upper ends of the adjacent levers of adjacent pairs.

In testimony whereof I have hereunto set my hand.

THOMAS L. BURTON.

Witnesses:
A. M. CLEMENTS,
S. W. KEEFER.